Figure 1:
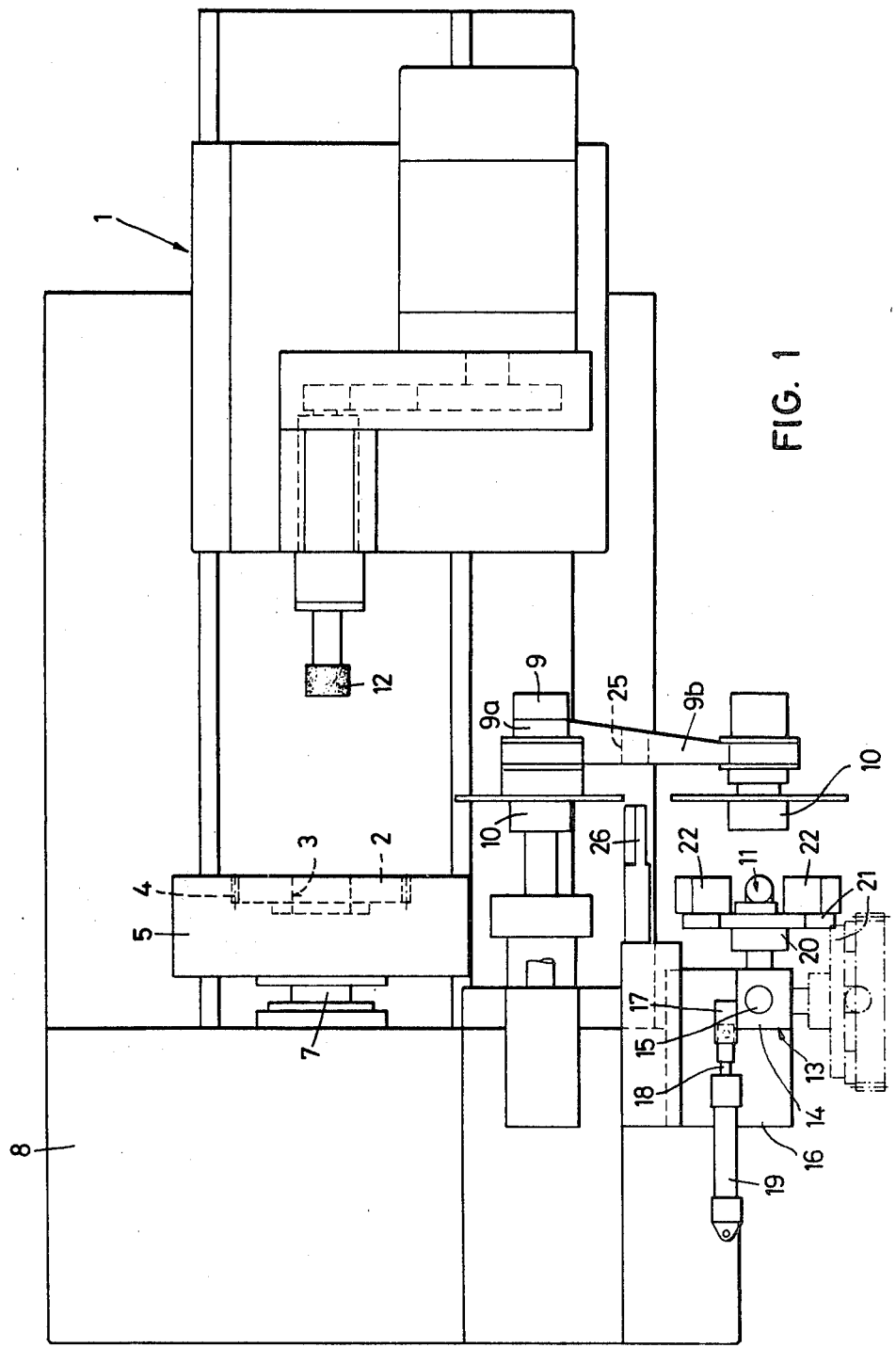

United States Patent [19]

Voumard et al.

[11] 4,161,849
[45] Jul. 24, 1979

[54] AUXILIARY WORKPIECE-LOADING AND -UNLOADING APPARATUS

[75] Inventors: Hugues Voumard; Roger Sauvain, both of La Chaux-de-Fonds, Switzerland

[73] Assignee: Voumard Machines Co., Switzerland

[21] Appl. No.: 862,931

[22] Filed: Dec. 21, 1977

[30] Foreign Application Priority Data

Dec. 22, 1976 [CH] Switzerland .................. 16193/76

[51] Int. Cl.² .................................................. B24B 5/10
[52] U.S. Cl. ............................... 51/215 CP; 414/728
[58] Field of Search .......... 51/105 R, 105 GG, 215 R, 51/215 AR, 215 HM, 215 CP, 215 H, 215 CE; 214/1 BC, 1 BD

[56] References Cited

U.S. PATENT DOCUMENTS

| | | | |
|---|---|---|---|
| 1,840,841 | 1/1932 | Highberg | 51/215 H |
| 1,876,372 | 9/1932 | White | 51/215 H |
| 3,849,944 | 11/1974 | Noll | 51/215 CP |
| 3,954,164 | 5/1976 | Bottomley | 51/215 H |
| 4,033,076 | 7/1977 | Price | 51/105 R |

FOREIGN PATENT DOCUMENTS 543933 12/1973 Switzerland .

*Primary Examiner*—Nicholas P. Godici
*Attorney, Agent, or Firm*—LeBlanc & Shur

[57] ABSTRACT

Apparatus for facilitating the loading and unloading of workpieces to be machined on a machine tool having a horizontal-axis headstock and at least one rotary or pendular arm designed to transport the workpieces, without changing their orientation, from a supply location to a machining station. The apparatus itself comprises a workpiece-holder pivoting about a vertical axis in synchronization with the movements of the rotary or pendular arm of the machine tool in such a way as to cause a workpiece support first to face toward the side of the machine tool manned by the operator, to facilitate loading of the workpiece, then to face in the direction of the longitudinal axis of the machine tool so that the workpiece may be correctly picked up by the rotary or pendular arm.

2 Claims, 2 Drawing Figures

AUXILIARY WORKPIECE-LOADING AND -UNLOADING APPARATUS

This invention relates to apparatus for facilitating the loading and unloading of workpieces to be machined on a machine tool, especially a grinding machine comprising a horizontal-axis headstock and at least one rotary or pendular arm designed to transport to a machining station, situated on the headstock, workpieces which it has taken from a supply location at which the workpieces are already oriented in the same manner as they will be at the machining station.

Loading devices, especially having one or more rotary or pendular arms, have already been provided on various types of machine tools, especially on grinding machines, and particularly on internal grinders. However, one particularity of such devices is that in order that the workpieces may first be picked up at the supply location for transport to the machining station, they must already be positioned with the same orientation they are to have when at the machining station, i.e., they must be so oriented that their axes (the workpieces involved are mainly circular or in the form of gears) are parallel to the usually horizontal axis of the headstock which is to support these workpieces during machining. These loading devices perform satisfactorily when the workpieces are relatively small and light; however, it has been realized that when the workpieces, particularly pieces to be ground, become larger and heavier, the loading devices present certain drawbacks, primary among which is that the operator of the machine tool is obliged to position these workpieces in a way that demands a very tiring movement on his part in order to place the workpieces correctly at the supply location where they are to be picked up by the rotary or pendular arm.

It is an object of this invention to avoid this drawback by providing apparatus to facilitate the loading and unloading of workpieces on a machine tool.

A further object of this invention is to provide apparatus which enables the operator of a machine tool to convey unmachined workpieces to, and also to take machined workpieces away from, a certain location and in a certain position such that the axes of these workpieces will be substantially perpendicular to the longitudinal axis of the machine tool, so that the operator is able to hold each workpiece with both hands, just in front of him.

To this end, in combination with a machine tool of the type initially mentioned, the auxiliary workpiece-loading and -unloading apparatus according to the present invention comprises a workpiece-holder which is pivotable about a substantially vertical axis, is capable of effecting alternating rotary movements about that axis in a sequence synchronized with the movements of the rotary or pendular arm of the machine tool, and includes workpiece support means for receiving each of the workpieces at the side of the machine tool manned by the operator and for subsequently presenting each of the workpieces in proper orientation to the rotary or pendular arm.

The workpiece-holder is preferably controlled by hydraulic, pneumatic or manual means correlatively to the movement of the rotary or pendular arm.

In a particularly preferred embodiment, suitable for use when the workpieces are circular or in the form of gears, the workpiece support means of the workpiece-holder comprise two lower shoes and a hydraulically- or pneumatically-controlled upper jack for pressing the workpiece vertically against the shoes in order to hold it firmly in place during the movement of the workpiece-holder. The shoes are adjustable in height so that when the workpiece-holder is facing in the direction of the longitudinal axis of the machine tool, the unmachined workpiece will be correctly positioned at the supply location where the rotary or pendular arm will come to pick it up, and the support means will be correctly positioned at the location where the rotary or pendular arm will leave the machined workpiece.

Figure 2:
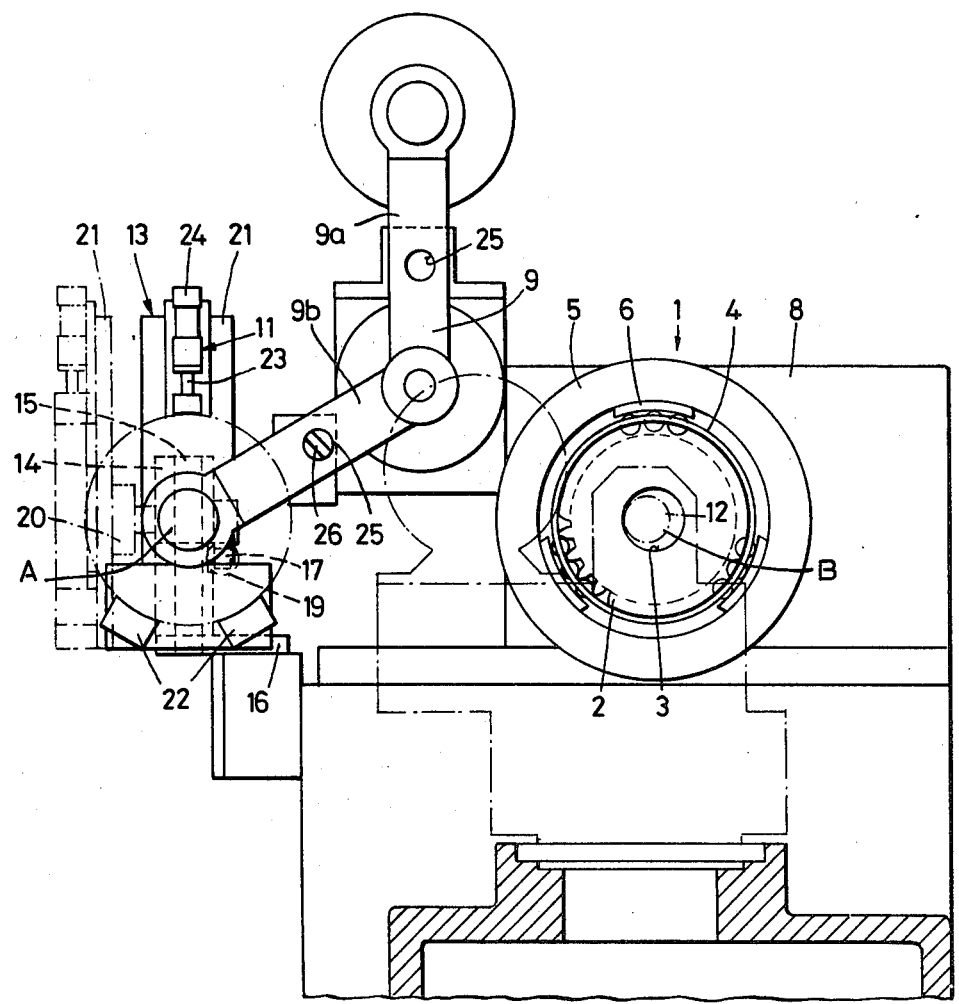

A preferred embodiment of the invention will now be described in detail with reference to the accompanying drawings, in which:

FIG. 1 is a plan view of a machine equipped with apparatus for facilitating the loading and unloading of workpieces, and FIG. 2 is an end-on view, partially in section, of the part of the aforementioned machine comprising the headstock and a rotary loadingmember, and of the apparatus for facilitating the loading and unloading of workpieces.

The drawings show an internal grinding machine 1 of which only the elements necessary for a proper understanding of the invention are designated by reference numerals. In the embodiment illustrated, the machine 1 is designed for grinding a bore 3 of a gear-wheel 2 mounted in a suitable roller-cage 4, it being understood that to grind a series of gear-wheels, a number of identical roller-cages 4 are available, in each of which a gear-wheel 2 is inserted before being put on the machine 1. A chuck 5, comprising three jaws 6 which move in strict synchronization, holds the workpiece 2 in place in the roller-cage 4 during the grinding operation. The chuck 5 is fixed to a spindle 7 driving the workpiece, and the spindle 7 is mounted and rotatingly driven in a headstock 8. Pneumatic or hydraulic means (not shown) control the clamping and unclamping of the jaws 6.

A loading device 9, equipped with two loading arms 9a and 9b, which may be of the type disclosed in Swiss Pat. No. 543,933, transports the workpieces 2 from a supply location A to the chuck 5 as well as transporting the already-machined workpieces 2 from a machining station B, i.e., from the chuck 5, to an unloading station which, in this instance, is the same as the supply location A. The two-armed device 9 effects rotary steps of 120° combined with movements of axial translation. At the time of these latter movements, elastic or extensible plugs (or clamps) 10 (FIG. 1) enter or withdraw from the central bores 3 of the workpieces 2 to be ground or already ground, respectively, in order to pick up or unload these workpieces 2. Starting from the position shown in the drawings, the two-armed device 9 first rotates through 120°, following which a translatory movement causes the loading of a piece to be machined on the arm 9a and of a piece which has just been machined on the arm 9b. For this loading, the plugs 10 swell while the chuck jaws 6 unclamp at the same time that a hydraulic jack 11 (to be described in more detail below) releases its pressure, so that the workpieces are held from the inside on the plugs 10 and no longer on the outside by the jaws 6 or the jack 11. Next, the two-armed device 9 moves axially again to disengage the workpieces from the supply location A and from the machining station B, respectively, then the device 9 carries out a third of a revolution, which brings the piece to be ground to a position facing the chuck 5 and the piece already ground to the highest position, where nothing takes place. In this position, the two-armed rotary device 9 carries out a new movement of translation, followed by a reclamping of the jaws 6 and, as the case may be, a release of the extensible plug 10 situated at the machining station B, thus causing the as yet unground workpiece to be held in the chuck 5. After that, the two-armed device 9 withdraws axially, leaving the piece to be machined at the machining station B, then carries out a last one-third of a revolution which returns it to the position shown in the drawings, from which position the device 9 once more effects a translatory motion which brings the workpiece already ground into the receiving arrangement of the supply location A (which simultaneously constitutes a receiving location for machined workpieces), whereupon a release of the plug 10 combined with a retightening of the jack 11 holds the machined workpiece at the receiving location and frees it from the two-armed device 9, which again withdraws axially to resume the position shown in the drawings. As soon as the workpiece to be machined is in place in the chuck 5 and the two-armed device 9 has freed the front of this workpiece, grinding of the bore 3 may begin by means of a grinding-wheel 12 visible only in FIG. 1. During the entire cycle of the device 9 as it has just been described, a workpiece-holder designated as a whole by reference numeral 13 has been in the position shown in solid lines in the drawings. While the bore 3 of the work-piece 2 is being ground, the workpiece-holder 13 will first rotate by one-quarter of a revolution about a vertical axis in order to arrive at the position shown in dot-dash lines in the drawing. In this position, the jack 11 will be released, and the grinding-machine operator will be able to remove the workpiece which has just been ground; he will be able to do so without difficulty since this workpiece is turned directly towards him. Thereafter, he will be able to place another workpiece to be ground in the workpiece-holder 13, still situated at the location shown in dot-dash lines, whereupon the jack 11 will be tightened again, and the workpiece-holder 13 will once more pivot by a quarter of a revolution in the other direction in order to be ready for the next change of workpieces which will take place as soon as the grinding operation then in progress has been terminated.

More detailed attention will now be given to the way in which the workpiece-holder 13 is constructed and operates. It will be seen from the drawings that it comprises a rotary block 14 pivoted on a vertical shaft 15 which is fixed in a part 16 adjoining the frame of the machine 1. On one side of the block 14 there is a stud 17 to which is hinged a piston 18 moved by a hydraulic or pneumatic cylinder 19, one end of which is pivoted on a part fixed to the machine 1. It will be readily understood that when pressure is applied in one direction in the cylinder 19, the piston 18 pushes against the stud 17 and causes the block 14 to pivot clockwise, thus bringing about the transition from the position shown in solid lines in the drawing to the position shown in dot-dash lines. Pressure applied in the other direction in the cylinder 19 will cause the block 14 to pivot the other way, so that the workpiece-holder 13 will resume the position shown in solid lines. Stop means (not shown) arrest the workpiece-holder 13 in each of the two end positions shown in solid lines and dot-dash lines, respectively.

As a variation, the rotary movement of the workpiece-holder 13 might be controlled manually. In that case, position detectors and bolting members—which may, incidentally, also be advantageously provided in the event of automatic control as well —should be installed to ensure a correct succession of the movements of the workpiece-holder 13 and of the rotary arm 9.

The rotary block 14 bears a vertical slide part 20 to which is secured, at a suitable height, a support member 21 which in turn bears two shoes 22 as well as the hydraulic or pneumatic jack 11 mentioned earlier. According to the size of the workpieces, various support members 21 may be used with shoes 22 closer together or farther apart, for the latter may themselves be displaced as need be. Moreover, the height of the shoes 22 may also be adjusted by moving the support member 21 up or down. The jack 11 comprises a pressure piston 23 actuated by a pneumatic or hydraulic cylinder 24 which, like the cylinder 19, is connected by ducts (not shown) to a hydraulic or pneumatic control which also controls certain movements of the two-armed rotary loader 9.

It will be readily understood that for workpieces of different dimensions, different support members 21 are used, with shoes 22 of different sizes and different spacing and a jack 11 situated higher or lower above the shoes 22. The loading and unloading position, i.e., the position in which the two-armed device 9 is going to pick up or put down the unground or ground workpiece, must be exactly determined. In the horizontal direction, the exact positioning is governed by the position of the support member 21, which is itself positioned exactly by the block 14 in the position thereof shown in solid lines. The two shoes 22 are always symmetrical in the horizontal direction, and the workpiece is always centered, in axial alignment with the vertical shaft 15. As for the position of the workpiece in the vertical direction, it may be adjusted exactly, just once for one entire series of operations, by moving the support member 21 upwards or downwards. It should be noted that the positions of the two arms 9a and 9b, at the time of engagement with a workpiece held on the shoes 22 and under the jack 11, must likewise be exactly determined in the rotary direction. For this reason, the arms 9a and 9b are provided with bores 25 intended to engage a positioning stud 26 when the two-armed device 9 carries out its transverse withdrawal movement, i.e., the movement towards the headstock.

It will also be noted that operation of the jack 11 should normally be automatic in conjunction with the operation of the two-armed device 9. It may, on the other hand, be manual or automatic, or else controlled by a pedal, in conjunction with the removal of a workpiece already ground and the placing of a new workpiece to be ground. In this latter case, a manual control will be grafted upon the automatic control, this manual control making it possible to loosen the jack, then to retighten it, it being understood that the course of the automatic operations is necessarily interrupted when the jack is loosened by manual control in order to remove a ground workpiece and substitute another to be ground.

The design which has just been described clearly makes it possible to facilitate the operations of placing and removing workpieces to be ground and already ground, these operations thus being made very easy for the operator even when the workpieces are relatively heavy. It goes without saying that the same workpiece-holder apparatus, composed of the elements 13 to 24, could be used in conjunction with another type of transport arm, e.g., a single or double pendular transport arm. Furthermore, it would be possible to stop the workpiece-holder in a loading position which, unlike that shown in the drawings, would not be completely perpendicular to the axial direction of the machine, but which, for reasons of convenience, would be more or less slightly oriented towards the front or towards the rear. Moreover, by slanting the shaft 15 slightly towards the headstock, but taking good care to keep it in a radial plane with respect to the axis of the headstock, a perhaps somewhat more advantageous position for depositing and seizing the workpiece might be obtained, this being a matter of design or possibly of adjustment. What is important above all is that in the position where the workpiece is presented to the rotary or pendular arm, this workpiece does indeed have the desired orientation, i.e., the same orientation it will have to have when it is mounted in the chuck 5 for the grinding operation.

Finally, it will be obvious that the same apparatus might be utilized for operations other than grinding, or even for workpieces which do not have any central bore beforehand, in which case the transport means—in this instance the two-armed device 9—would have to comprise members for gripping from the outside rather than the elastic or extensible plugs 10.

What is claimed is:

1. Auxiliary workpiece loading and unloading apparatus for use with a machine tool comprised of a workpiece supply location, a horizontal axis headstock having a machining station, and transport means having one or more rotary or pendular arms for causing workpieces to be moved from said supply location to said machining station without said workpieces undergoing a change of orientation, said apparatus comprising: a workpiece holder pivotable about a substantially vertical axis, capable of effecting alternating rotary movements about said vertical axis in a sequence synchronized with the movements of said transport means; means for causing said workpiece holder to carry out said alternating rotary movements correlatively to the movements of said rotary or pendular arm; workpiece support means for receiving each of said workpieces at a side of said machine tool and for subsequently presenting each of said workpieces in proper orientation to said transport means, said workpiece support means including two lower shoes and a hydraulically or pneumatically controlled upper jack for pressing said workpieces vertically against said shoes in order to hold said workpieces firmly in place during said movements of said workpiece holder, said shoes being adjustable in height so that when said workpiece holder is facing in the direction of the longitudinal axis of said machine tool, an unmachined workpiece will be correctly positioned at said supply location to be picked up by said rotary or pendular arm, and said workpiece support means will be correctly positioned at a location to receive a machined workpiece from said rotary or pendular arm.

2. A combination in accordance with claim 1 comprising two said rotary arms moving conjointly, wherein said workpiece-holder cooperates with said two rotary arms, one of said arms coming to pick up a said workpiece to be machined at said supply location while the other of said arms goes to pick up a machined said workpiece at said machining station, said one arm then going, after rotation of said two arms, to place said workpiece to be machined at said machining station while said other arm goes to place said machined workpiece on said workpiece support means of said workpiece-holder.

* * * * *